US012804253B2

(12) United States Patent
Sharman et al.

(10) Patent No.: US 12,804,253 B2
(45) Date of Patent: Nov. 17, 2026

(54) MOIRE HEAT MAP FOR VIRTUAL PRODUCTION SET

(71) Applicant: Sony Group Corporation, Tokyo (JP)

(72) Inventors: Karl James Sharman, Basingstoke (GB); Sarah Witt, Basingstoke (GB); Alan Turner, Basingstoke (GB)

(73) Assignee: Sony Group Corporation, Tokyo (JP)

( * ) Notice: Subject to any disclaimer, the term of this patent is extended or adjusted under 35 U.S.C. 154(b) by 37 days.

(21) Appl. No.: 19/026,020

(22) Filed: Jan. 16, 2025

(65) Prior Publication Data

US 2025/0247611 A1 Jul. 31, 2025

(30) Foreign Application Priority Data

Jan. 30, 2024 (GB) ..................................... 2401210

(51) Int. Cl.
*H04N 23/60* (2023.01)
*H04N 5/222* (2006.01)
*H04N 23/63* (2023.01)

(52) U.S. Cl.
CPC ........... *H04N 23/64* (2023.01); *H04N 5/2224* (2013.01); *H04N 5/2228* (2013.01); *H04N 23/632* (2023.01); *H04N 23/634* (2023.01); *H04N 23/635* (2023.01)

(58) Field of Classification Search
None
See application file for complete search history.

(56) References Cited

U.S. PATENT DOCUMENTS 11,039,083 B1 * 6/2021 Levin ........................ G06T 7/90
2018/0342050 A1 * 11/2018 Fitzgerald .......... G01N 21/8851
2022/0094844 A1 * 3/2022 Deng ...................... G06T 11/60
2022/0159190 A1 * 5/2022 Asukabe ................ G03B 17/18
2022/0191401 A1 * 6/2022 Asukabe ................ H04N 23/60
2024/0296612 A1 * 9/2024 Rhodes ................... G06T 13/40
2024/0388787 A1 * 11/2024 Sugano .................. H04N 5/275
2025/0301099 A1 * 9/2025 Hirose ................... H04N 23/84

FOREIGN PATENT DOCUMENTS

WO WO-2023047643 A1 * 3/2023 ............. H04N 23/81
WO WO-2023238646 A1 * 12/2023 ............... H04N 9/73
WO WO-2024048295 A1 * 3/2024 ........... H04N 23/635

* cited by examiner

*Primary Examiner* — Paul M Berardesca
(74) *Attorney, Agent, or Firm* — Tucker Ellis LLP

(57) ABSTRACT

A device including circuitry configured to: define a virtual production set including a display wall and a target to be captured by a camera when the camera is located at a plurality of positions on the set; and generate a heat map indicating the probability of a moiré pattern being generated in an image captured by the camera when located at each of the positions on the set based upon at least one parameter associated with the display wall, the position of the target relative to the display wall and the camera; and provide the generated heat map is described.

15 Claims, 7 Drawing Sheets

MOIRE HEAT MAP FOR VIRTUAL PRODUCTION SET

RELATED APPLICATION DATA

This application claims the benefit of GB Application No. 2401210.6, filed Jan. 30, 2024, the disclosure of which is incorporated herein by reference in its entirety.

BACKGROUND

Field of the Disclosure

The present technique relates to a device, computer program and method.

Description of the Related Art

The “background” description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present technique.

Virtual Production (VP) is becoming increasingly popular in cinematography. In VP, a large wall of display is provided showing the set in front of which actors perform. The cameras capture the actors in front of the large wall.

As the cameras capture images displayed on a display wall, a moiré pattern may be generated. This is unsatisfactory in a production environment. Therefore, it is necessary to analyse the potential of generating a moiré pattern for any given location of the camera and the display showing the set.

This is laborious and very time consuming.

It is an aim of the disclosure to at least address this issue.

SUMMARY

According to embodiments of the disclosure, there is provided a device comprising circuitry configured to: define a virtual production set including a display wall and a target to be captured by a camera when the camera is located at a plurality of positions on the set; and generate a heat map indicating the probability of a moiré pattern being generated in an image captured by the camera when located at each of the positions on the set based upon at least one parameter associated with the display wall, the position of the target relative to the display wall and the camera; and provide the generated heat map.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
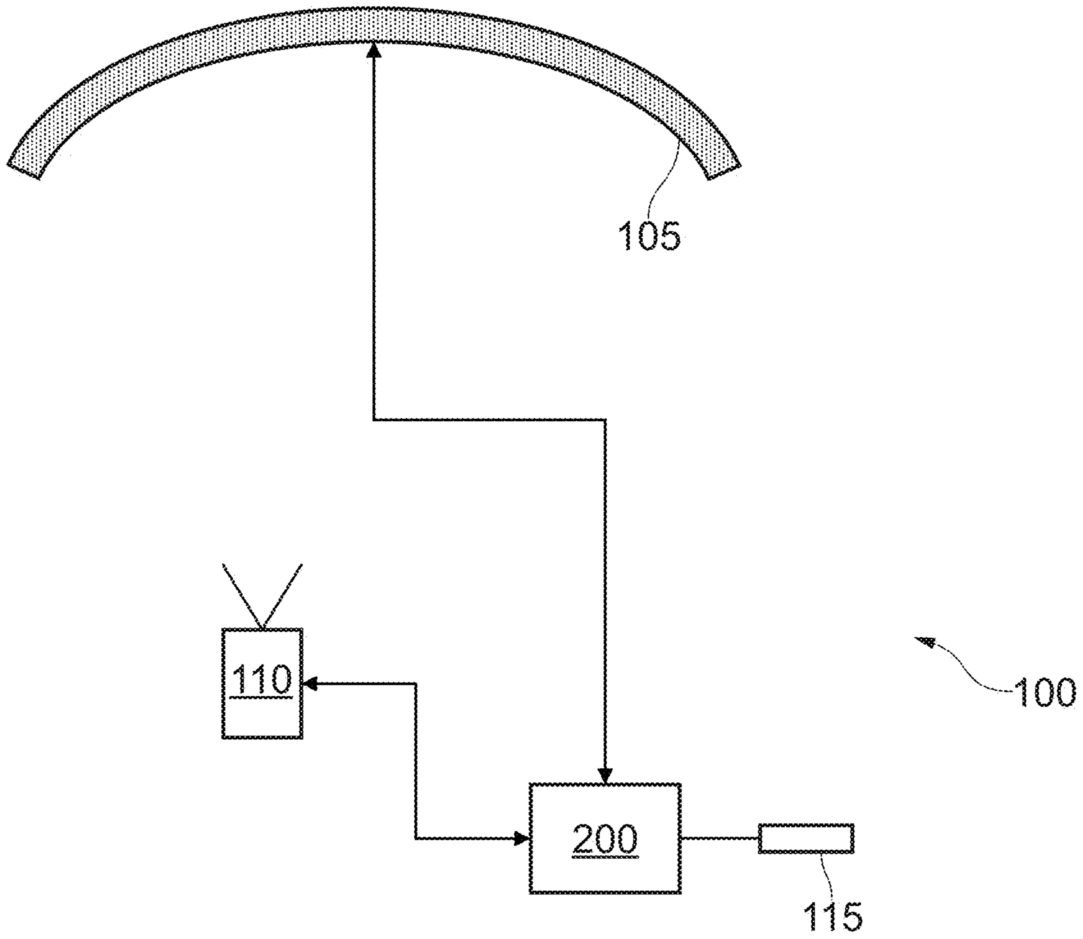
FIG. 1 shows a virtual production set 100 according to embodiments.

Referring now to the drawings, wherein like reference numerals designate identical or corresponding parts throughout the several views.

Numerous modifications and variations of the present disclosure are possible in light of the above teachings. It is therefore to be understood that within the scope of the appended claims, the disclosure may be practiced otherwise than as specifically described herein.

FIG. 1 shows a virtual production set 100 according to embodiments. The virtual production set 100 includes a display wall 105 and at least one camera 110. The camera 110 is connected to a device 200 according to embodiments of the disclosure. In addition, the device 200 is connected to the display wall 105. Of course, the disclosure is not so limited and in embodiments, the device 200 is a standalone device which is optionally connected to one or both of the camera 110 and/or the display wall 105.

In embodiments, the display wall 105 is a Sony VERONA Crystal® Light Emitting Diode (LED) wall. Of course, the disclosure is not so limited and any display wall suitable for use in a Virtual Production environment is envisaged. Further, in embodiments, the display wall is curved, though the disclosure is not so limited. In addition, in embodiments, the camera 110 is a Sony VENICE® camera, although the disclosure is not so limited and any camera is envisaged.

In embodiments, the device 200 is connected to a user display 115 which may be a computer tablet or computer display. Although not shown, the device 200 is connected to a user input device which may be a computer mouse or may be a touch screen located on the user display 115. The purpose of the user display 115 is to allow the user to see a user interface allowing the user to interact with the device 200. In embodiments, of course, the device 200 may display the user interface on the display wall 105.

Figure 2:
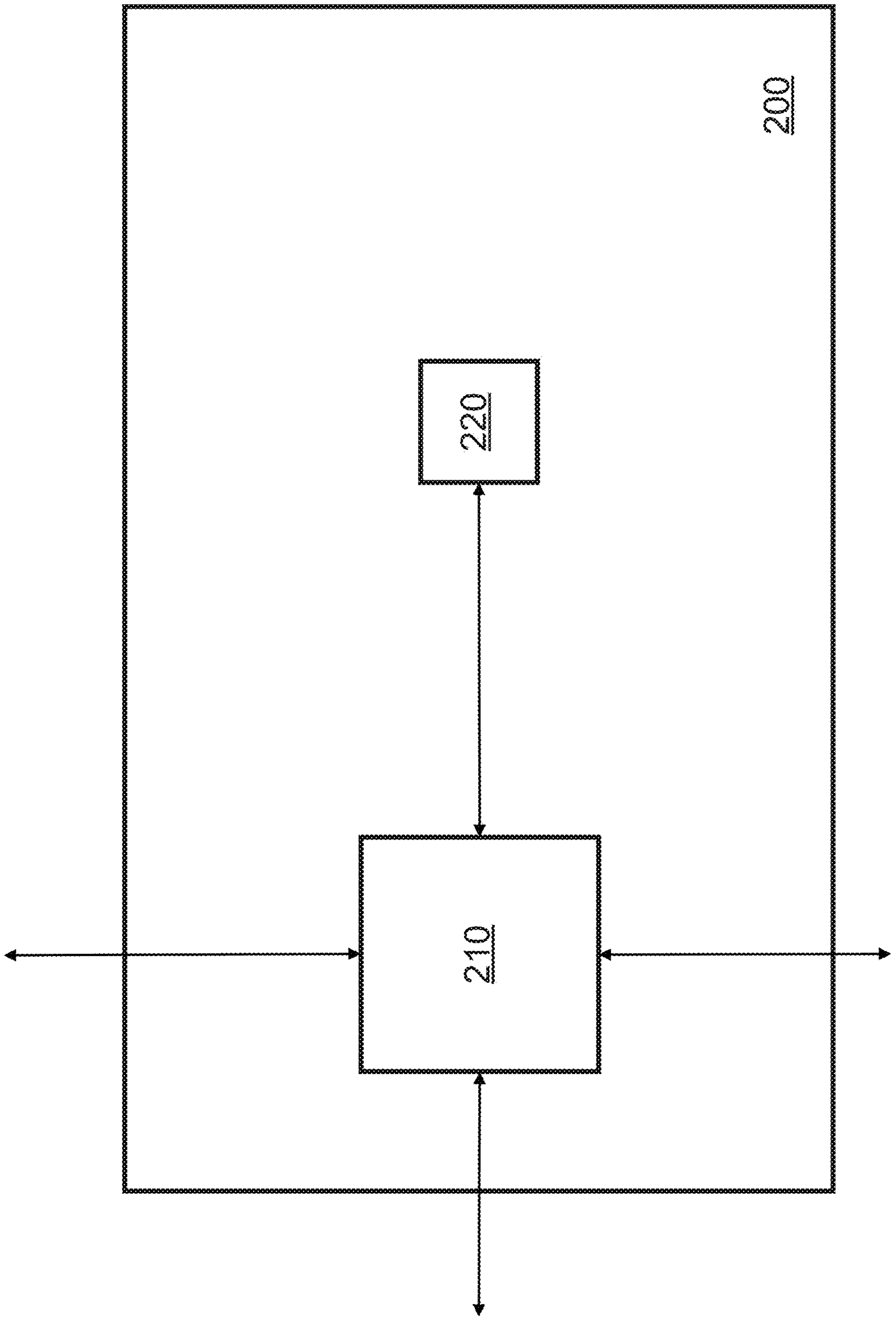
FIG. 2 shows a device 200 according to embodiments of the disclosure.

FIG. 2 shows a device 200 according to embodiments of the disclosure. The device 200 comprises a processor 210 which is embodied as circuitry and may be any solid state circuitry such as circuitry controlled by software or an application specific integrated circuit. The processor 210 is connected to the camera 110, the user display 115 and the display wall 105. This connection may be over a wired or wireless network or may be a point-to-point connection. The processor 210 is also connected to storage 220. In embodiments, the storage 220 is solid-state storage, but is not limited and may be optically readable storage or the like. Moreover, the storage 220 may be located remote to the device 200. In embodiments, the storage 220 contains computer readable instructions which, when loaded onto the processor 210, configures the device 200 to perform a method or methods according to embodiments of the disclosure.

In embodiments, the storage 220 includes a Virtual Production Tool-Set which allows a studio to be planned. In high quality Virtual Production Tool-Sets, the position of the camera or camera on the set are tested relative to the display wall 105. This allows for the likelihood of a moiré pattern to be established. The mechanism for determining the likelihood of a moiré pattern being generated is known and uses camera and display wall parameters as would be understood by the skilled person and so will not be disclosed any further here. One further example of a moiré pattern predictor is provided in [1].

However, even with the high quality Virtual Production Tool-Sets, in order for the set-designer to see the likelihood of moiré, the set designer must place the camera at a location within the Virtual Production set. Accordingly, in order to determine the likelihood of the camera position creating a moiré pattern, the set designer will need to place the camera at every possible location within the set. This is very time consuming.

Figure 3A:
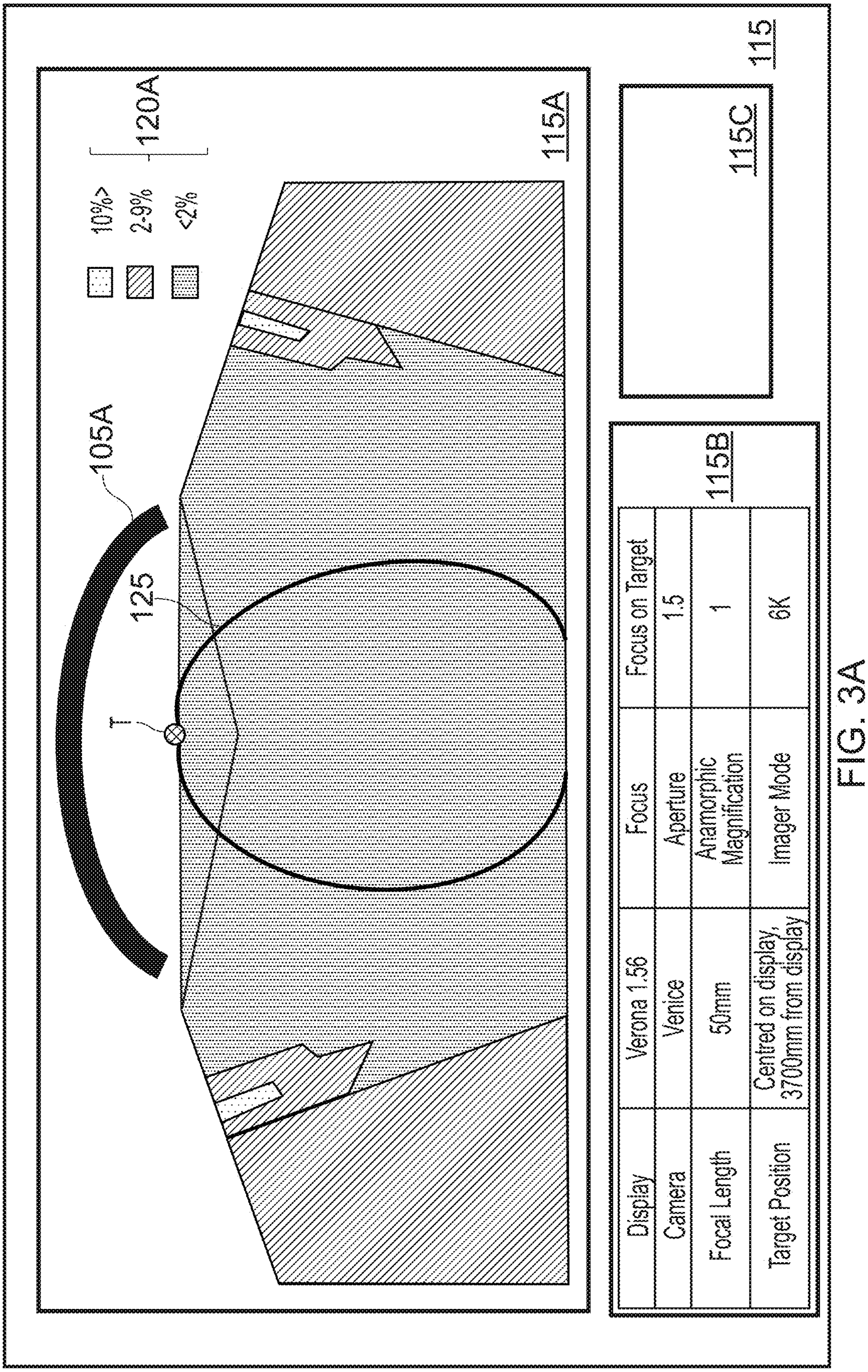
FIGS. 3A to 3C show the user display 115 showing a graphical user interface generated by a device 200 according to embodiments.
Figure 3B:
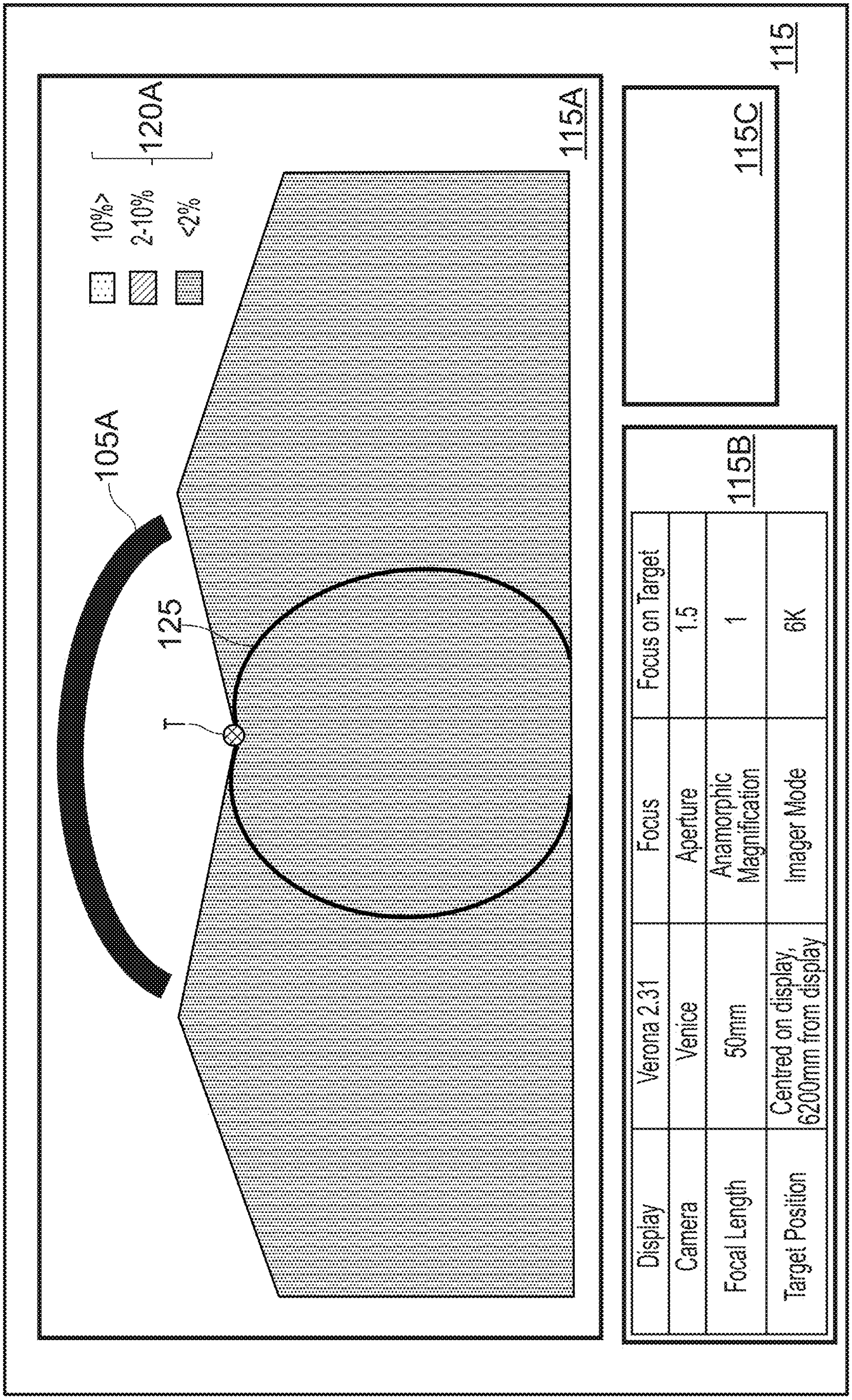
Figure 3C:
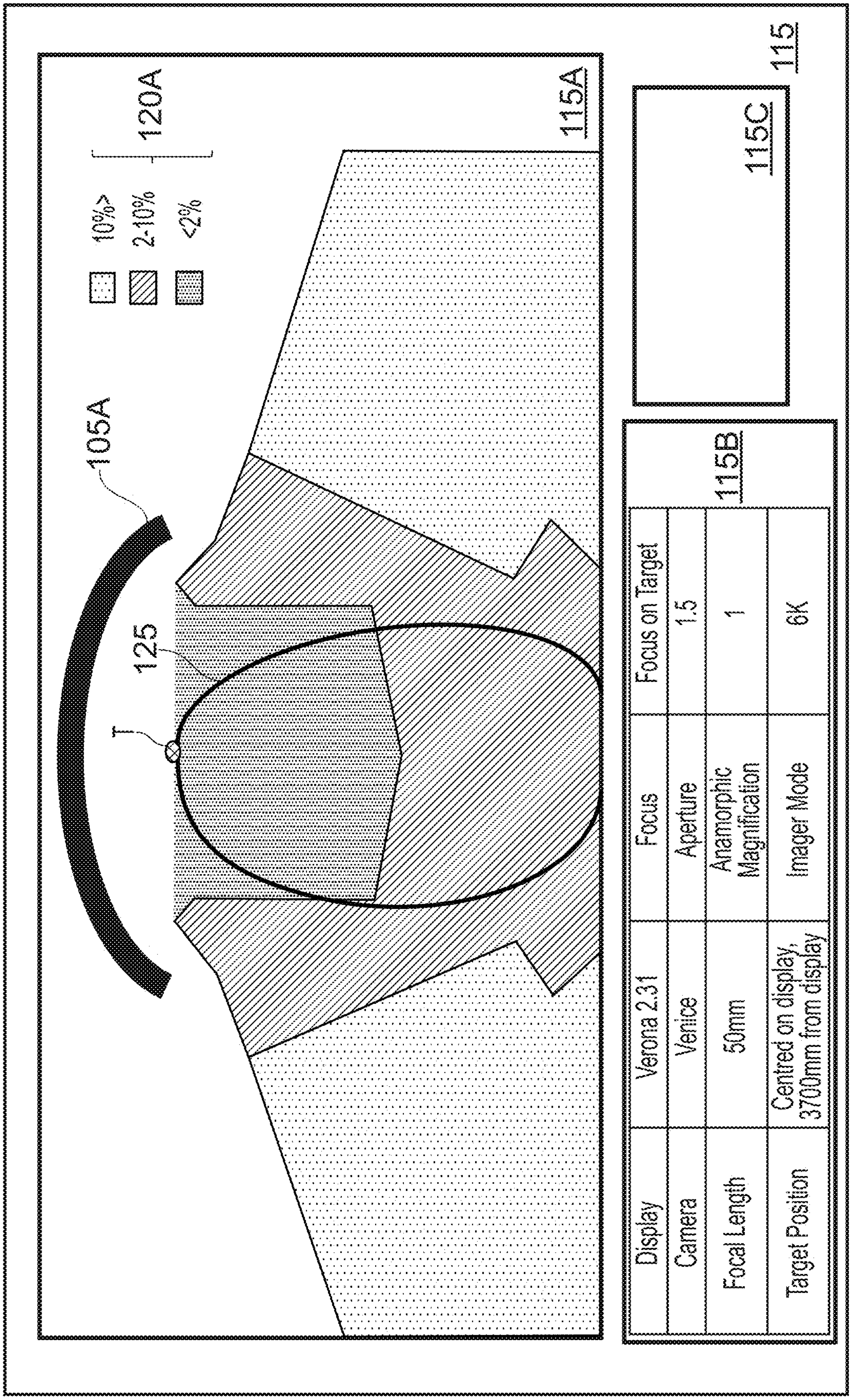

Referring to FIGS. 3A to 3C, the user display 115 showing a graphical user interface generated by a device 200 according to embodiments is shown. The user display 115 has three areas. In a first area 115A an aerial view of the defined virtual production set is shown. The aerial view has a heat map overlaid. The aerial view shows a representation of the display wall 105A and the remainder of the virtual production set (and so may include representations of cameras, microphones, actors and the like; although none are shown for clarity). In addition a target T is shown which is an object or the area of interest being captured in a particular scene (for example an actor, or prop or the like). In other words, the defined virtual production set is the virtual production set shown on the user display 115.

In addition, the heat map displays regions which identify the likelihood of a moiré pattern being generated should a camera be located in this area. Of course, although in embodiments there are three regions shown, the disclosure is not so limited and any number of regions may be shown depending on the required granularity of the data being represented. Moreover, in the embodiments of FIGS. 3A to 3C, these regions are distinct (in that they have defined boundaries), the disclosure is not so limited and the boundaries may blur together and the colours at the boundary edges may also smoothly transition. The regions may be filled with a colour or a pattern to identify the extent of the region more easily. Moreover, in embodiments where colour is used to define and fill the heat map regions, the colours may be red, yellow and green to simulate a traffic light system. This provides an even quicker indication to the user about the location of a camera and the likelihood of a moiré pattern being generated.

The purpose of the heat map is to provide a quick indication to the user of the likelihood of a moiré pattern being generated if the camera is placed in that area. In particular, the heat map shows the probability of a moiré pattern being generated if a camera is placed within that area. A heat map is a term of art and is a representation of data in the form of a map or diagram in which data values are represented as colours or patterns. In embodiments, the data in the heat map is probability data.

In addition to the heat map, the first area 115A includes a key 120A which indicates the probability associated with a particular pattern. Specifically, the key, in embodiments, identifies three regions; a first region having a probability of greater than 10%, a second region having a probability of 2 to 9% and a third region having a less than 2%. As noted above, the number of regions and the granularity may be selected by the user. In addition, a pair of boundary lines 125 is shown. The boundary lines 125 indicate areas where, when the camera is placed within the boundary, capturing the target in the field of view, the display wall covers the entire field of view of the camera. In areas outside of the boundary, other areas such as areas to the side of the display wall 105 are visible. Of course, it is possible that the boundary lines are not required where areas that are not the display are added to the analysis for example if a part of the captured picture to the right of the display wall is a set wall, which the camera may point at without moiré issues.

Within user display 115, a second area 115B is provided. The second area 115B shows parameters of the display 105 and the camera 110 being used on the virtual production set. Specifically, the display 105 is a Verona 1.56 and the camera is a Venice camera which are high quality products made by Sony Corporation®. In addition, the focal length of the camera is set at 50 mm. The position of the target is also defined as being in the centre of the display, but 3700 mm from the display and the focus of the camera is noted as being the target. This is because the focus of the camera has an impact on the moiré effect as would be appreciated. The aperture setting on the camera is defined as 1.5 and the anamorphic magnification of the camera is set at 1. Finally, the imager mode of the camera is set at 6K. As would be appreciated by the skilled person more or less parameters may be defined which will allow the probability of a moiré pattern being generated to be determined.

In order to generate the heat map, the parameters defined in the second area 115B are entered into a moiré pattern predictor and the probability of a moiré pattern occurring with a camera located at that point is calculated. This, in embodiments, is done for each possible camera position located within the virtual production set. Accordingly, a map of probabilities for each possible camera position is generated. The map of probabilities is coloured according to the key 120A and overlaid on the aerial view of the virtual production set.

It should be noted here that, in embodiments, a 2D heat map is generated. In order to achieve this, a fixed horizontal plane of the camera is assumed. In other words, the moiré pattern predictor only provides a probability for the camera looking at the target T in a single horizontal plane. In embodiments, of course, and as will be appreciated, a 3D heat map is envisaged where the camera can look at the target from any particular position in a 3D space.

By providing the heat map, the user can quickly establish a desired region within the virtual production set for cameras to be located. So, for example, in the embodiments of FIG. 3A, the user can quickly establish that the camera should most likely be located in the third region and so the user can ignore the first and second region.

Referring back to FIG. 3A, the user display 115 also shows a third area 115C. The third area 115C, in embodiments, shows the field of view of a camera which is placed at any area within the virtual production set displayed in the first region 115A. This allows the set designer to determine the most appropriate camera position within the virtual production set to capture the target T.

Referring to FIG. 3B, a user display screen 115 is shown with different parameters provided in the second area 115B. Specifically, the display 105 is a Verona 2.31 display manufactured by Sony Corporation® and the target position is centred on the display and 6200 mm from the display 105A. Again, the target T is marked in FIG. 3B. As will be evident, the larger distance between the target and the display means there is a lower probability of a moiré pattern being generated.

Referring to FIG. 3C, a user display screen 115 is shown with different parameters provided in the second area 115B. Specifically, the display 105 is a Verona 2.31 display manufactured by Sony Corporation® and the target position is centred on the display and 3700 mm from the display 105A. Again, the target T is marked in FIG. 3C.

Figure 4:
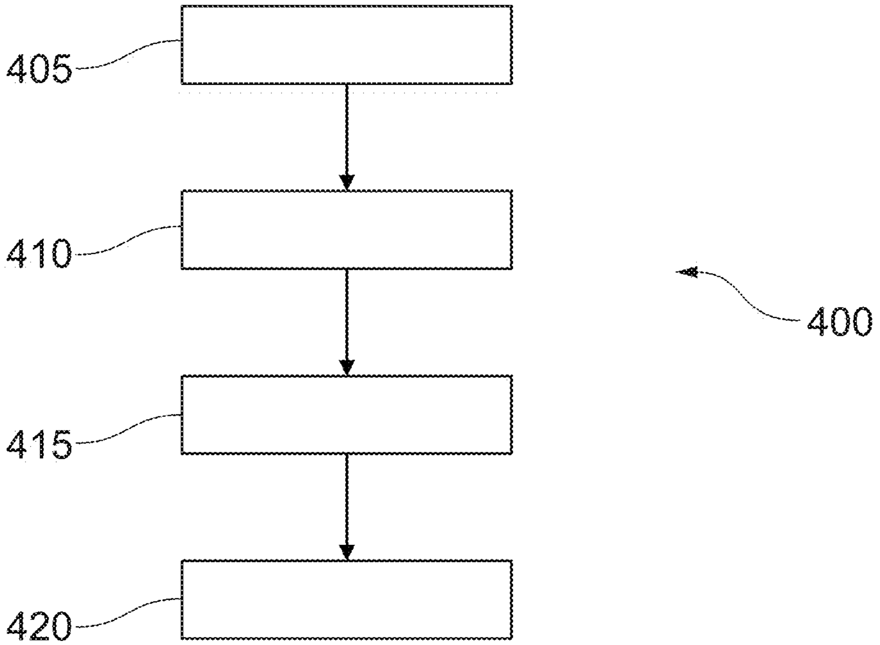
FIG. 4 shows a process 400 according to embodiments performed by the device 200.

FIG. 4 shows a process 400 according to embodiments performed by the device 200. The process starts at step 405 and moves to step 410 where a virtual production set including a display wall and a target to be captured by a camera when the camera is located at a plurality of positions on the set is defined. In embodiments, the size of the virtual production set is defined. The defined virtual production set may be a representation of the virtual production set such as that shown on the user display 115 or may be the physical virtual production set. The process moves to step 415.

In step 415, a heat map is generated that shows the probability of a moiré pattern being generated in an image captured by the camera when located at each of the positions on the set based upon at least one parameter associated with the display wall, the position of the target relative to the display wall and the camera. The process then moves to step 420 where the device 200 provides the generated heat map.

This may be provided, in embodiments, for overlaying on the defined virtual production set. The device 200 may provide the generated heat map to the user display 115, the camera operator via the camera viewfinder or a separate monitor or may provide the generated heat map to a mechanism for display on the floor of the virtual production set such as a projector or floor mounted lights.

The process ends in step 420.

Figure 5:
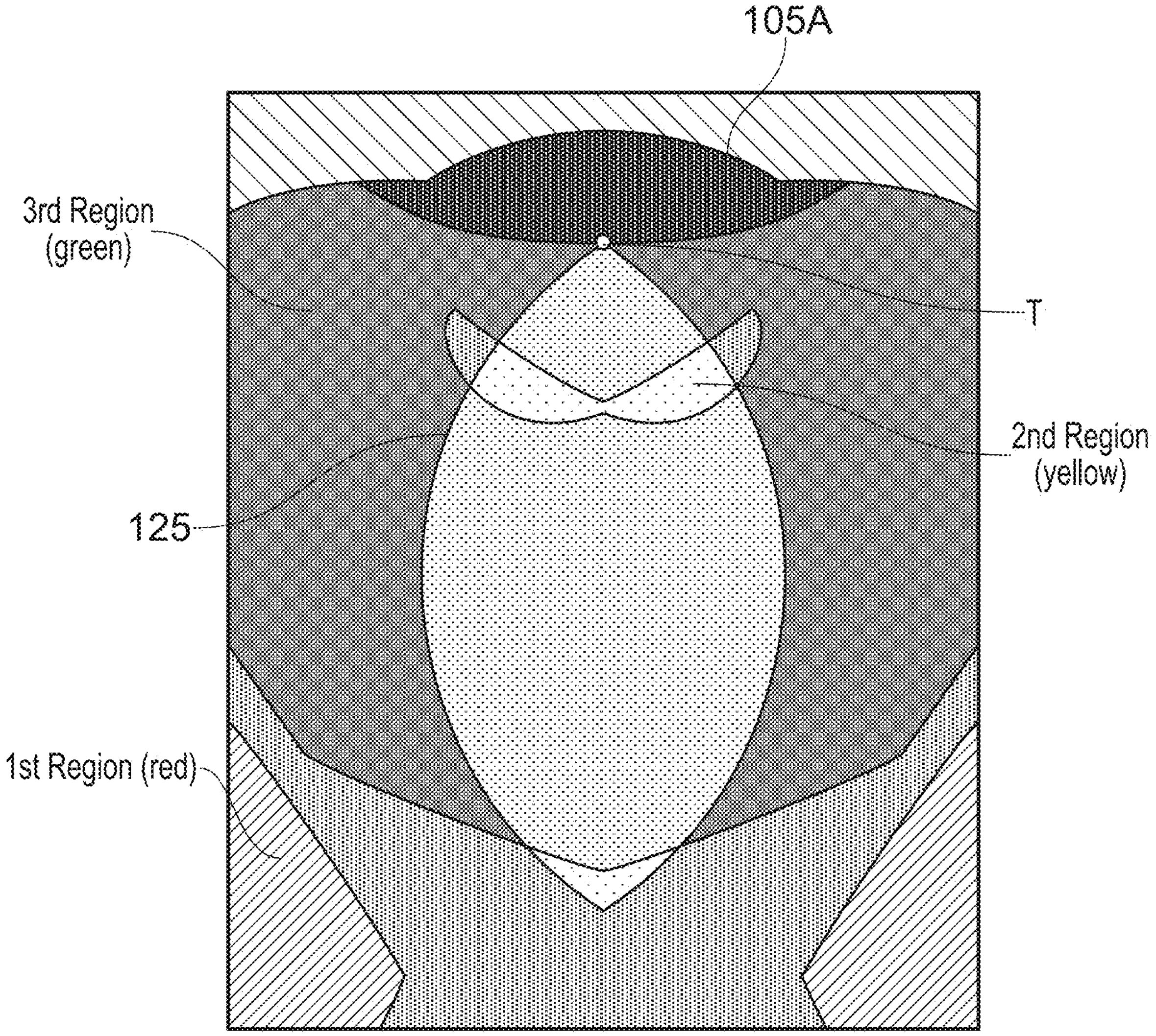
FIG. 5 shows a heat map generated by a device 200 according to embodiments of the disclosure

Referring to FIG. 5, a heat map generated by the device 200 according to embodiments is shown. This heat map includes the pair of boundary lines 125 which define an area likely to have the camera or cameras located therein. The display wall 105A from FIGS. 3A to 3C is shown as are the first, second and third regions. Furthermore, the target T is shown. As will be immediately apparent to the skilled person, the provision of the heat map provides a mechanism that allows the user to identify where the camera should be located on the virtual production set.

Although the foregoing has been described with reference to the heat map being provided on the defined virtual production set being provided on the user display 115, the disclosure is not so limited. In embodiments, the heat map may be provided to a live camera operator which may be superimposed as a map or indicator on the viewfinder or via a second screen near the camera operator so that as a camera operator moves around the virtual production set, the camera operator will be aware of a transition between an area with a low probability risk of a moiré pattern being generated to an area with a higher probability risk of a moiré pattern being generated. In addition, if the camera operator does move from one area to a different area the camera operator can be informed. For example, if the camera operator moves from one region to another region having a higher probability of a moiré pattern being generated, an alert such as an audible alert is, in embodiments, generated. This alert can occur as the camera operator approaches the boundary or after the camera operator goes over the boundary. This reduces the risk of a moiré pattern being generated as the camera operator captures the scene as moiré effects may not be noticed until post-production.

In embodiments, the heat maps may be projected or lit or otherwise presented on the floor of the virtual production set during the planning stage. This will assist in providing a geographical reference within the virtual production set allowing the cameras to be more easily placed. In other words, the defined virtual production set may also include the real-life virtual production set.

Although the foregoing describes a single target, the disclosure is not so limited. In embodiments, there are a plurality of targets. In these embodiments, the heat map for each target is generated in turn and the probability heat map is for the plurality of targets is generated based upon a combination of all the generated heat maps. In embodiments, this may be the highest probability of a moiré pattern being generated being included in the heat map or the mean average probability at each point within the heat map or may be achieved by merging the plurality of heat maps using known techniques.

Although the foregoing describes a device 200 being connected to a camera 110, the disclosure is not so limited. In embodiments, the heat map may be created remotely to the virtual production set. In other words, the user may have a terminal into which the required parameters are input and the heat map generated remotely to the set. The terminal may run the heat map generation algorithm as a web service or a standalone application on the terminal. In these instances, the appropriate information relating to the size of the virtual production set and the parameters set out in the second area 115B are provided to the web service or application and the heat map is generated. The heat map may then be provided on the user display 115 as explained above, or may be provided to any of the camera/virtual production set for presenting on the floor of the virtual production set.

In embodiments, the heat map is updated as a parameter is updated. For example, if a camera parameter is changed by a user, the heat map will be updated. This means that the heat map dynamically changes as the parameters change. Of course, the disclosure is not so limited and the heat map may be set and refreshed only in response to a user's input.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

Embodiments of the present technique can generally described by the following numbered clauses:

1. A device comprising circuitry configured to:
   define a virtual production set including a display wall and a target to be captured by a camera when the camera is located at a plurality of positions on the set; and
   generate a heat map indicating the probability of a moiré pattern being generated in an image captured by the camera when located at each of the positions on the set based upon at least one parameter associated with the display wall, the position of the target relative to the display wall and the camera; and
   provide the generated heat map.
2. A device according to clause 1, wherein the circuitry is configured to provide the generated heat map for overlaying on the defined virtual production set.
3. A device according to clause 1 or 2, wherein the heat map comprises a plurality of regions, wherein each region is filled according to the probability of a moiré pattern being generated.
4. A device according to clause 3, wherein each region is filled with colour, the colour being indicative of the probability of a moiré pattern being generated.
5. A device according to any preceding clause, wherein the circuitry is configured to provide the generated heat map to a camera operator.
6. A device according to clause 4, wherein the circuitry is configured to provide the generated heat map to a camera operator via a display or a camera viewfinder.
7. A device according to any one of clauses 1 to 4, wherein the circuitry is configured to provide the generated heat map to the floor of the virtual production set.
8. A method comprising:
   defining a virtual production set including a display wall and a target to be captured by a camera when the camera is located at a plurality of positions on the set; and
   generating a heat map indicating the probability of a moiré pattern being generated in an image captured by the camera when located at each of the positions on the set based upon at least one parameter associated with the display wall, the position of the target relative to the display wall and the camera; and
   providing the generated heat map.
9. A method according to clause 8, comprising providing the generated heat map for overlaying on the defined virtual production set.
10. A method according to clause 8 or 9, wherein the heat map comprises a plurality of regions, wherein each region is filled according to the probability of a moiré pattern being generated.
11. A method according to clause 10, wherein each region is filled with colour, the colour being indicative of the probability of a moiré pattern being generated.
12. A method according to any one of clause 8 to 11, comprising: providing the generated heat map to a camera operator.
13. A method according to clause 12, comprising providing the generated heat map to a camera operator via a display or a camera viewfinder.
14. A method according to any one of clauses 8 to 11, comprising providing the generated heat map to the floor of the virtual production set.
15. A computer program comprising computer readable instructions which, when loaded onto a computer, configures the computer to perform a method according to any one of clauses 8 to 14.

REFERENCES

[1] https://virtualproducer.io/the-goldilocks-zone-and-virtual-production-stages/

What is claimed is:

1. A device comprising circuitry configured to:
   define a virtual production set including a display wall and a target to be captured by a camera when the camera is located at a plurality of positions on the set; and
   generate a heat map indicating the probability of a moiré pattern being generated in an image captured by the camera when located at each of the positions on the set based upon at least one parameter associated with the display wall, the position of the target relative to the display wall and the camera, the heat map comprising a spatial representation of a map of probabilities calculated for each camera position within the virtual production set; and
   provide the generated heat map.

2. The device according to claim 1, wherein the circuitry is configured to provide the generated heat map for overlaying on the defined virtual production set.

3. The device according to claim 1, wherein the heat map comprises a plurality of regions, wherein each region is filled according to the probability of a moiré pattern being generated.

4. The device according to claim 3, wherein each region is filled with colour, the colour being indicative of the probability of a moiré pattern being generated.

5. The device according to claim 1, wherein the circuitry is configured to provide the generated heat map to a camera operator.

6. The device according to claim 4, wherein the circuitry is configured to provide the generated heat map to a camera operator via a display or a camera viewfinder.

7. The device according to claim 1, wherein the circuitry is configured to provide the generated heat map to the floor of the virtual production set.

8. A method comprising:
   defining a virtual production set including a display wall and a target to be captured by a camera when the camera is located at a plurality of positions on the set; and
   generating a heat map indicating the probability of a moiré pattern being generated in an image captured by the camera when located at each of the positions on the set based upon at least one parameter associated with the display wall, the position of the target relative to the display wall and the camera, the heat map comprising a spatial representation of a map of probabilities calculated for each camera position within the virtual production set; and
   providing the generated heat map.

9. The method according to claim 8, comprising providing the generated heat map for overlaying on the defined virtual production set.

10. The method according to claim 8, wherein the heat map comprises a plurality of regions, wherein each region is filled according to the probability of a moiré pattern being generated.

11. The method according to claim 10, wherein each region is filled with colour, the colour being indicative of the probability of a moiré pattern being generated.

12. The method according to claim 8, comprising: providing the generated heat map to a camera operator.

13. The method according to claim 12, comprising providing the generated heat map to a camera operator via a display or a camera viewfinder.

14. The method according to claim 8, comprising providing the generated heat map to the floor of the virtual production set.

15. A non-transitory computer readable medium storing a computer program comprising computer readable instructions that, when executed by a computer, configures the computer to perform the method according to claim 8.

* * * * *